United States Patent Office 2,951,872
Patented Sept. 6, 1960

2,951,872
CATALYSTS AND PROCESS FOR THE PREPARATION OF ALKYL SULFIDES

Hillis O. Folkins, Crystal Lake, and Elmer L. Miller, Cary, Ill., assignors to The Pure Oil Company, Chicago, Ill., a corporation of Ohio No Drawing. Filed Aug. 9, 1955, Ser. No. 527,415

10 Claims. (Cl. 260—609)

This invention relates to the synthesis of thioethers. It is more directly concerned with catalyst compositions employed in promoting the efficiency of the reaction between low molecular weight alcohols and hydrogen sulfide to produce low molecular weight aliphatic monosulfides.

Because alkyl monosulfides show a marked tendency to form addition products with a wide variety of chemicals, e.g., mercuric salts, halogens, alkyl halides and others, they are important as chemical intermediates. For example, mild oxidation employing reagents such as nitric acid, selenium dioxide, potassium permanganate, hydrogen sulfide, etc., converts thioethers to sulfoxides, which have a variety of uses, e.g., dimethyl sulfoxide, an important chemical for use as a solvent, antifreeze, etc.; ethyl sulfoxide, a plasticizer for pyroxylin, etc. In addition, the lower molecular weight thioethers exhibit solvency action for a variety of organic substances alone or in combination with other organic materials, such as low molecular weight aliphatic monohydric alcohols.

It is known that thioethers can be prepared by means of a plurality of syntheses. Perhaps the best known from a commercial standpoint involves the formation of monosulfides from organic halides and sodium mercaptides in a reaction related to the Williamson synthesis. In carrying out this type of reaction, it has also been found possible to employ sodium ethoxide with the merceptan and halogen derivative. Other reactions which are disclosed in the literature involve the reacting of sulfur and a normally gaseous monoolefin under suitable reaction conditions. Also, sulfides may be formed by the action of some mercaptans with an alcohol. However, this reaction is not flexible because in certain instances the reactants involved react to form the oxyether. For example, benzyl mercaptan and ethyl alcohol react to form an oxyether. While excellent yields may be obtained from the reaction between an alkyl halide and a sodium mercaptide, the reactants involved in this type of reaction are not always readily available under favorable economic conditions to permit large scale production. While the latter two reactions employ substances which can be economically and conveniently obtained or produced from various by-products from industries such as the petroleum industry, the low yields or unpredictability of these reactions make them unsatisfactory from an economical and commercial standpoint. However, it has been found, according to this invention, that excellent yields of low molecular weight thioethers may be produced by reacting a low molecular weight aliphatic monohydric alcohol and hydrogen sulfide.

It is, therefore, an object of this invention to provide an economical and practcal process for the preparation of alkyl monosulfides from aliphatic, monohydric alcohols and hydrogen sulfide. It is a further object of this invention to provide a catalyst composition which may be employed effectively in increasing the production of alkyl monosulfide from an aliphatic, monohydric acohol and hydrogen sulfide. These and other objects will become more apparent from the following detailed description of the instant invention.

One of the classic reactions for the production of thiols involves the reaction:

(1) 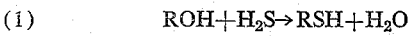
$$ROH + H_2S \rightarrow RSH + H_2O$$

In carrying out this reaction, alkyl monosulfides are produced as a by-product by the competing reaction:

(2) 
$$2ROH + H_2S \rightarrow R_2S + 2H_2O$$

or by the condensation of at least part of the thiols produced in reaction 1 according to:

(3) 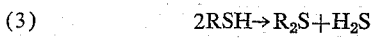
$$2RSH \rightarrow R_2S + H_2S$$

The subject invention is concerned primarily with the production of alkyl monosulfides which presumably occurs to the main extent by reaction 2 accompanied to some degree by thiol conversion as represented by reaction 3. However, the selection of a catalyst for effecting this objective cannot be made on the basis of experience with catalyst compositions developed for the production of thiols in accordance with the foregoing reaction. For example, some catalyst compositions which have been employed in promoting this reaction to produce substantial amounts of thiols do not exhibit a sensitivity to mole ratio of reactants. Regardless of whether a low or high ratio of hydrogen sulfide to alcohol is employed, the selectivity of these catalysts toward the production of alkyl monosulfides remains low and substantially unvarying.

According to this invention, it has been found that by reacting a low molecular aliphatic alcohol with hydrogen sulfide under suitable reaction conditions in the presence of a solid, porous, acidic oxide, hydrocarbon cracking catalyst, e.g., activated alumina, synthetic silica-alumina combinations, acid-treated natural clays, silica-magnesia, silica-zirconia, silica-titania, and other related compounds, promoted with at least one oxide of a metal selected from the group consisting of silver, cerium, zinc and copper, almost quantitative selectivity for monosulfide formation can be obtained. By carrying out the invention under controlled operating conditions, alkyl monosulfides can be produced as the principal products from the reaction between a low molecular weight saturated aliphatic monohydric alcohol and hydrogen sulfide.

In carrying out the reaction, temperatures in the range of 600–950° F. may be employed. In the event that higher molecular weight alcohols are employed, the operating temperatures are lowered. Preferred temperatures for reacting methanol and hydrogen sulfide are in the range of 700–850° F. Pressures may vary widely, but are in the range of atmospheric to 200 p.s.i.g. Since increase in pressure tends to favor sulfide formation over that of thiols, it is generally preferable to operate at pressures greater than atmospheric. Preferred ranges of pressure are 50–200 p.s.i.g. Preferred mole ratios of hydrogen sulfide/alcohol are in the range of 0.2–0.7, although mole ratios outside this range may be employed. However, ratios of reactants in excess of the preferred range have a deleterious effect on the selectivity of the catalyst for producing the alkyl sulfide.

To illustrate the subject invention, comparative data was obtained by reacting methanol with hydrogen sulfide in the presence of an alumina catalyst and a copper oxide-promoted alumina catalyst. In carrying out these reactions, the following operating conditions were employed:

Table I

|  | $Al_2O_3$(F-10) +2% CuO | $Al_2O_3$ |
|---|---|---|
| Temperature, °F | 752 | 752 |
| Pressure, p.s.i.g | Atm. | Atm. |
| LVHSV [1] | 0.39 | 0.39 |
| Charge: | | |
| MeOH, gms./hr | 9.12 | 9.10 |
| $H_2S$, gms./hr | 19.37 | 19.35 |
| Mole Ratio: $H_2S$:MeOH | 2.0 | 2.0 |

| Catalyst | Yield, Mole percent of Alcohol | | Selectivity, percent | |
|---|---|---|---|---|
| | RSH | $R_2S$ | RSH | $R_2S$ |
| $Al_2O_3$(F-10) [2] | 47.1 | 21.6 | 68.9 | 31.1 |
| $Al_2O_3$(F-10) [2] +2% CuO | 43.1 | 33.8 | 56.0 | 44.0 |

[1] Liquid volume hourly space velocity = liquid volume at 60° F. of limiting reactant fed per hour per unit volume of effective reactor or catalyst bed.
[2] A proprietary activated alumina obtained from the Aluminum Co. of America.

From the data in Table I, it is seen that the copper oxide-promoted alumina catalyst manifests excellent selectivity with respect to thioether production, even at relatively high mole ratios of reactants, e.g., 2.0. It has been found that the reactant ratio has a distinct effect upon selectivity for sulfide formation. Accordingly, in carrying out the subject reaction in the presence of the catalysts of this invention at a reactant ratio of about 0.6, within the preferred range, increased conversion and almost quantitative selectivity for sulfide formation will be obtained.

As further illustrations of our invention catalysts composed of activated alumina (F-10) promoted by silver oxide, zinc oxide, or cerium oxide, were tested under the same conditions as for the catalysts in Table I. Results obtained are listed in Table II.

Table II

| Catalyst | Yield, mole percent (based on methanol) | | Selectivity, percent | |
|---|---|---|---|---|
| | $CH_3SH$ | $(CH_3)_2S$ | $CH_3SH$ | $(CH_3)_2S$ |
| $Al_2O_3$(F-10)+c% ZnO | 49.1 | 30.9 | 61.0 | 38.5 |
| $Al_2O_3$(F-10)+c% $Ag_2O$ | 49.3 | 27.3 | 63.8 | 35.4 |
| $Al_2O_3$(F-10)+c% $CeO_2$ | 45.7 | 33.0 | 57.8 | 41.7 |

These data show the increased selectivity for sulfide formation effected by the silver oxide-alumina, zinc oxide-alumina, or cerium oxide-alumina catalysts as compared to that obtained over activated alumina alone, even under high hydrogen sulfide/methanol ratios of 2. At lower reactant mole ratios of $H_2S/CH_3OH$ of around 0.6, conversions are increased and selectivities for sulfide production exceed 80%.

In another example, hydrogen sulfide and methanol are passed at a mole ratio ($H_2S/CH_3OH$) of 0.6 over a catalyst composed of silica-alumina cracking catalyst (13% $Al_2O_3$) promoted by 3% CuO. At 750° F., atmospheric pressure, and at a liquid volume hourly space velocity of 0.4 (based on methanol), an 80 mole percent yield of methyl sulfide at a selectivity of 92% is obtained.

In still another example, hydrogen sulfide and ethanol are reacted over the same catalyst as above (silica-alumina+3% CuO). At 725° F., $H_2S$/ethanol mole ratio of 0.6, and at a liquid hourly space velocity of 0.6 (based on ethanol), a mole yield of 74% of ethyl sulfide at 88% selectivity is obtained.

To further illustrate, hydrogen sulfide and methanol are reacted over a catalyst consisting of 2 wt. percent zinc oxide on a support comprised of silica-alumina-zirconia (88:7:5). At 750° F., $H_2S$/methanol mole ratio of 0.6, atmospheric pressure, and at a liquid hourly space velocity of 0.4 (based on methanol charged), a molal yield of 75% of methyl sulfide at a selectivity of 90% is obtained.

It has also been found that the catalysts of this invention are specific in that they are receptive to changes in reactant ratio, whereas many other catalysts of this nature are not. Reference to Table III will show several catalyst compositions which exhibit substantially no change in selectivity for sulfide formation, regardless of the mole ratio of reactions employed.

Table III

| Catalyst | °F. Temp. | Pressure | LVHSV | Mole Ratio, $H_2S/CH_3OH$ | Methyl Sulfide | |
|---|---|---|---|---|---|---|
| | | | | | Yield (Mole Percent) | Selectivity, Percent |
| $Al_2O_3$—$K_2CO_3$ (5.3 wt. percent) | 752 | Atm | 0.39 | 2.00 | 3.3 | 3.9 |
| Do | 752 | Atm | 0.39 | 1.54 | 4.3 | 5.4 |
| Do | 752 | Atm | 0.39 | 1.19 | 3.5 | 4.8 |
| Do | 752 | Atm | 0.39 | 0.89 | 3.3 | 5.0 |
| Pumice—$ThO_2$ (25%) | 738 | Atm | 0.49 | 1.04 | 7.0 | 12.1 |
| Do | 805 | 100 p.s.i.g | 0.55 | 1.90 | 6.2 | 11.7 |
| Do | 714 | Atm | 0.53 | 1.00 | 4.4 | 13.8 |

The above data show that the potassium carbonate-alumina catalyst produces low yields of methyl sulfide and that selectivity of reaction is not altered by wide changes in reactant ratios. Similarly, the pumice-thoria catalyst showed little or no change in yield or selectivity with wide changes in operating conditions.

The catalysts which may be employed in carrying out the instant invention are composite catalysts comprising as an active support a solid, porous, acidic oxide, hydrocarbon cracking catalyst, e.g., activated alumina, synthetic silica-alumina combinations, acid-treated natural clays, silica-magnesia, silica-zirconia, silica-titania, and other related combinations, promoted with at least one oxide of a metal selected from a group consisting of silver, cerium, zinc and copper. The preferred amount of metal oxide promoter which is incorporated in the catalyst composition is between about 1–10% by weight of the catalyst. The promoters may be incorporated in the highly active, porous supports either by impregnation or co-precipitation methods.

In the preparation of these catalysts the copper, cerium, silver, or zinc oxide promoters may be added to an already existing support by impregnating the porous support with a solution of a decomposable salt of the metal, such as the nitrate. The impregnated support is then calcined to convert the adsorbed salt to the oxide. Co-precipitation methods may be employed, also. Thus, in the preparation of a copper oxide on alumina catalyst, a solution of a soluble salt of aluminum, such as the nitrate or chloride, may be mixed with a solution of copper salt, such as the nitrate. The solution may be precipitated with a base, such as ammonium hydroxide, and the resulting gel filtered, washed and calcined to yield the desired catalyst. Similarly, with a silica-alumina support the silica gel may be formed with addition of an acid to water-glass. The alumina and the metal oxide promoter may then be incorporated by precipitation of salts with ammonium hydroxide or other suitable base. The resultant gel is then filtered, washed and calcined to give the finished catalyst. In these cases it is necessary to calcine at high enough temperatures to decompose the metal salt to the oxide and to stabilize the support. Calcination temperatures are usually in the range of 800–1200° F. In the case of silver it may be desirable to re-oxidize the catalyst at lower temperatures in order to preserve the promoter in the oxide form. Similarly, the acid-type support and the metal oxide promoter may be prepared separately, finely ground, mixed, and mechanically formed into pellets or other discrete particles.

Since the process and catalyst are operable in either fixed bed or fluidized operation, the physical form of the catalyst will be determined by the type of process to be employed. In fixed bed operation it is desirable to size the material into a fairly narrow range of mesh size or to pellet the material into conventional, uniform pellets. In fluid operation the material will be ground or formed into powder or microspheres in known manner.

The relative percentages of component parts in these catalyst supports may vary widely. In the case of silica-alumina cracking catalysts, the silica percentage is usually around 75 to 90 percent. These make excellent supports. On the other hand, gamma-alumina, and gamma-alumina containing as little as 5% silica (both of which show acidic characteristics), combine with the oxides of copper, cerium, silver and zinc to give catalysts which effect high yields of alkyl sulfides at high selectivity.

In the practice of this invention, there can be used any low molecular weight aliphatic monohydric alcohol having 1–8 carbon atoms per molecule. This includes methyl alcohol, propyl alcohol, butyl alcohol, sec-butyl alcohol, n-amyl alcohol, and n-octyl alcohol. Although generally reactant alcohols will be charged separately, mixtures of alcohols may be employed. In such cases a mixture of sulfides will be produced, their respective amounts corresponding in general to the relative reactivities of the alcohols. In general, symmetrical sulfides corresponding to the respective alcohols will be formed along with varying amounts of unsymmetrical sulfides, providing the reactivities of the charged alcohols are not greatly different. Thus, a mixture of charged methyl and ethyl alcohol will yield principally methyl and ethyl sulfides with varying amounts of methyl ethyl sulfide. Although excellent feed conversions and selectivities can be obtained by controlling the reactant ratios employing the catalysts of this invention, increased efficiency may be obtained by recycle operations wherein unreacted products contained in the reaction effluent are returned to the reaction zone for further processing. Accordingly, by employing a proper recycle system, alkyl monosulfide yields approaching 100% may be obtained.

The purification process employed in recovery of the thioethers prepared according to this invention will depend upon the volatility characteristics of the end-product. Generally, however, conventional fractional condensation and distillation processes may be employed, as well as suitably designed absorption processes.

Accordingly, we claim as our invention:

1. A process for the preparation of a low molecular weight alkyl mono-sulfide which comprises reacting a $C_1$–$C_8$ alkanol with hydrogen sulphide, at a temperature within the range of about 650°–950° F., a pressure within the range of about atmospheric–200 p.s.i.g., and a mol ratio of $H_2S$/alcohol within the range of about 0.2–0.7 in the presence of a composite catalyst consisting essentially of a major portion of a solid, porous, acidic oxide, hydrocarbon cracking catalyst having incorporated therein 1–10% by weight of at least one oxide of a metal selected from the group consisting of silver, cerium, and zinc to enhance the catalytic activity of said acidic oxide catalyst.

2. A process for the preparation of a low molecular weight, alkyl, monosulfide which comprises reacting $C_1$–$C_8$ alkanol at a temperature within the range of about 650°–950° F., a pressure within the range of about atmospheric–200 p.s.i.g., and a mol ratio of $H_2S$/alcohol within the range of about 0.2–0.7 in the presence of a composite catalyst selected from the group consisting of activated alumina promoted with 1–10% by weight of at least one oxide of a metal selected from the group consisting of zinc, silver and cerium, and zinc oxide-promoted silica-alumina-zirconia.

3. A process in accordance with claim 2 in which said composite catalyst consists essentially of a major portion of activated alumina having incorporated therein at least one oxide of a metal selected from the group consisting of silver, cerium, and zinc.

4. A process in accordance with claim 2 in which said composite catalyst consists essentially of a zinc oxide-promoted silica-alumina-zirconia hydrocarbon cracking catalyst.

5. A process for the preparation of dimethyl monosulfide which comprises reacting hydrogen sulfide and methanol in a mol ratio of $H_2S$/methanol within the range of about 0.2–0.7, a temperature within the range of about 700–850° F. and a pressure within the range of atmospheric–200 p.s.i.g., in the presence of a composite catalyst consisting essentially of a major portion of a solid, porous, acidic oxide, hydrocarbon cracking catalyst having incorporated therein 1–10% by weight of at least one oxide of a metal selected from the group consisting of silver, cerium, and zinc to enhance the catalytic activity of said acidic oxide catalyst.

6. A process for the preparation of dimethyl monosulfide which comprises reacting hydrogen sulfide and methanol in a mol ratio of $H_2S$/methanol within the range of about 0.2–0.7 at a temperature within the range of about 700–850° F. and a pressure within the range of atmospheric–200 p.s.i.g., in the presence of a composite catalyst selected from the group consisting of activated alumina promoted with 1–10% by weight of at least one oxide of a metal selected from the group consisting of zinc, silver and cerium, and zinc oxide-promoted silica-alumina-zirconia.

7. A process in accordance with claim 6 in which said composite catalyst consists essentially of a major portion of activated alumina having incorporated therein at least one oxide of a metal selected from the group consisting of silver, cerium, and zinc.

8. A process in accordance with claim 6 in which said composite catalyst consists essentially of a zinc oxide-promoted silica-alumina-zirconia hydrocarbon cracking catalyst.

9. A process for the preparation of a low molecular weight alkyl mono-sulfide which comprises reacting a $C_1$–$C_8$ alkanol with hydrogen sulfide, at a temperature within the range of about 650°–950° F., a pressure within the range of about atmospheric–200 p.s.i.g., in the presence of a composite catalyst consisting essentially of a major portion of a solid, porous, acidic oxide, hydrocarbon cracking catalyst having incorporated therein 1–10% by weight of at least one oxide of a metal selected from the group consisting of silver, cerium, and zinc to enhance the catalytic activity of said acidic oxide catalyst.

10. A process for the preparation of dimethyl monosulfide which comprises reacting hydrogen sulfide and methanol at a temperature within the range of about 700°–850° F. and a pressure within the range of atmospheric–200 p.s.i.g., in the presence of a composite catalyst consisting essentially of a major portion of a solid, porous, acidic oxide, hydrocarbon cracking catalyst having incorporated therein 1–10% by weight of at least one oxide of a metal selected from the group consisting of silver, cerium, and zinc to enhance the catalytic activity of said acidic oxide catalyst.

References Cited in the file of this patent

UNITED STATES PATENTS

| | | |
|---|---|---|
| 2,565,195 | Bell | Aug. 21, 1951 |
| 2,667,515 | Beach | Jan. 26, 1954 |
| 2,816,146 | Doumani | Dec. 10, 1957 |